United States Patent
Hunter et al.

[15] 3,666,284
[45] May 30, 1972

[54] HYDRAULIC DEPTH CONTROL FOR DRAWN IMPLEMENT CARRIERS HAVING PIVOTED OUTER FRAMES

[72] Inventors: George Dwight Hunter; Richard Wayne Hook, both of Des Moines, Iowa

[73] Assignee: Deer & Company, Moline, Ill.

[22] Filed: July 23, 1968

[21] Appl. No.: 753,337

Related U.S. Application Data

[63] Continuation of Ser. No. 577,849, Sept. 8, 1966, abandoned.

[52] U.S. Cl. ................................................ 280/43.23
[51] Int. Cl. ............................................... B62d 21/18
[58] Field of Search ................... 280/43.23; 91/189, 411; 60/54.5, 52, 53; 172/316, 303

[56] References Cited

UNITED STATES PATENTS

| | | |
|---|---|---|
| 3,411,800 | 11/1968 | Krumholz ........................ 280/43.23 |
| 2,112,466 | 3/1938 | Maloon ........................... 60/52 |
| 2,637,259 | 5/1953 | Acton ............................. 172/316 |
| 2,641,886 | 6/1953 | Graham .......................... 280/43.23 |
| 2,925,871 | 2/1960 | Gillette .......................... 172/303 |
| 3,240,506 | 3/1966 | McMullen ....................... 280/43.23 |

*Primary Examiner*—Benjamin Hersh
*Assistant Examiner*—Robert R. Song
*Attorney*—H. Vincent Harsha, Raymond L. Hollister, Harold M. Knoth, William A. Murray and John M. Nolan

[57] ABSTRACT

An implement carrier including a main frame and outrigger frames mounted on vertically movable wheels operated by a plurality of series-connected double-acting hydraulic cylinders. Each of the cylinders is provided with an integral bypass which automatically synchronizes the cylinders each time they are moved to their limit in one direction to raise the frame to its transport position and the last cylinder in the series when moving the frames to the working position is provided with an adjustable integral stop which limits the movement of the cylinders.

17 Claims, 2 Drawing Figures

PATENTED MAY 30 1972　　3,666,284

*INVENTORS.*
GEORGE D. HUNTER
RICHARD W. HOOK

BY John C. Thompson
ATTORNEY

HYDRAULIC DEPTH CONTROL FOR DRAWN IMPLEMENT CARRIERS HAVING PIVOTED OUTER FRAMES

CROSS REFERENCE TO RELATED APPLICATION

This application is a continuation of application Ser. No. 577,849 filed 8 September 1966, now abandoned.

BACKGROUND OF THE INVENTION

The present invention relates generally to agricultural machinery and more particularly to drawn implement carriers having pivoted outrigger sections, the main frame of the implement carrier as well as the outrigger sections being supported by ground-engaging wheel means which are movable between raised and lowered positions to move the implement carrier between a gauged working depth and a raised transport position.

In prior art implement carriers of the type referred to above, it has been customary to mount a tractor remote cylinder (provided with an integral stop) on the main frame of the carrier and to interconnect the remote cylinder with the wheel means on the main frame either through a rockshaft or through cables and sheaves. The integral stop will limit movement of the wheels toward the frame, thereby controlling the working depth as the cylinder is retracted while movement of the cylinder in the other direction will cause the implement to be raised to its transport position. The outrigger frame sections have been supported by wheel means whose working position has been controlled through a cable and sheave arrangement. The cable and sheave arrangement has not proved entirely satisfactory because the cables tend to vary in length with usage and do not have satisfactory wear characteristics. Since the length of the cables does not remain constant, positive depth control of the outriggers in their working position is available only through the use of manually actuated stops which are pre-set to the desired working depth. It is not possible to have positive depth control over a range of working depths without manually adjusting the outrigger depth stops to each new desired depth.

In other prior art implements of the type referred to above, it has been customary to mount the main frame and outrigger frames on wheel means whose working position was controlled through hydraulic cylinders which were connected in parallel with one another. This arrangement has not proved entirely satisfactory because, as fluid was supplied to or exhausted from the cylinders, the frames would not necessarily be raised or lowered in unison and would not necessarily be raised or lowered the same distance unless the cylinders were extended or retracted to the end of their stroke. Therefore, it was not possible to have positive depth control of each frame over a range of working depths without providing an adjustable mounting for each cylinder or an adjustable stop on each cylinder and without adjusting the mounting of or the stop on each cylinder for each new desired depth.

SUMMARY OF THE INVENTION

It is an object of the present invention to provide means for raising and lowering an implement carrying frame of the class referred to in which a plurality of hydraulic cylinders are employed for raising and lowering the individual frame sections, the hydraulic cylinders being connected in series so that all portions of the frame will be raised and lowered in unison.

Another object of this invention is to provide for an implement frame having a plurality of ground-engaging means and a plurality of serially connected hydraulic cylinders operable to raise and lower the ground-engaging means, the displacement of the cylinders being matched so that the movement of one of the cylinders will cause the following cylinder to move a corresponding amount.

Another object of this invention is to provide means for simultaneously and accurately gauging at all operating depths the working positions of all the independently pivoted portions of an implement carrying frame of the class referred to in which a plurality of hydraulic cylinders are employed for raising and lowering the individual frame sections.

Yet another object of this invention is to provide a means for raising and lowering all the independently movable portions of an implement frame of the class referred to which simultaneously and accurately gauges the working positions of all portions of the frame over a range of working positions without requiring an adjustment of all the frame supporting structures for each new desired working position.

It is still a further object of the invention to provide a center frame and outrigger frames that are independently movable vertically relative to one another, to provide independent hydraulic means for each frame to raise and lower the respective frame, and to connect the hydraulic means on the outrigger frames in series with one another and with the hydraulic means of the center frame whereby all frames will vertically adjust in unison and in equal amounts.

A further object is to provide integral bypass means within hydraulic raising and lowering means whereby when the hydraulic means are moved in one direction they will move into phase with each other.

A further object of this invention is to provide means for raising and lowering an implement carrier having pivoted outrigger frames which is reliable in operation, easy to control, and relatively low in cost.

These and other objects and advantages of this invention will be apparent to those skilled in the art after a consideration of the following detailed description, taken in conjunction with the accompanying drawings in which the preferred form of this invention is illustrated.

DESCRIPTION OF THE PREFERRED EMBODIMENT

In the following description right-hand and left-hand reference is determined by standing to the rear of the implement carrier and facing the direction of travel.

Figure 1:
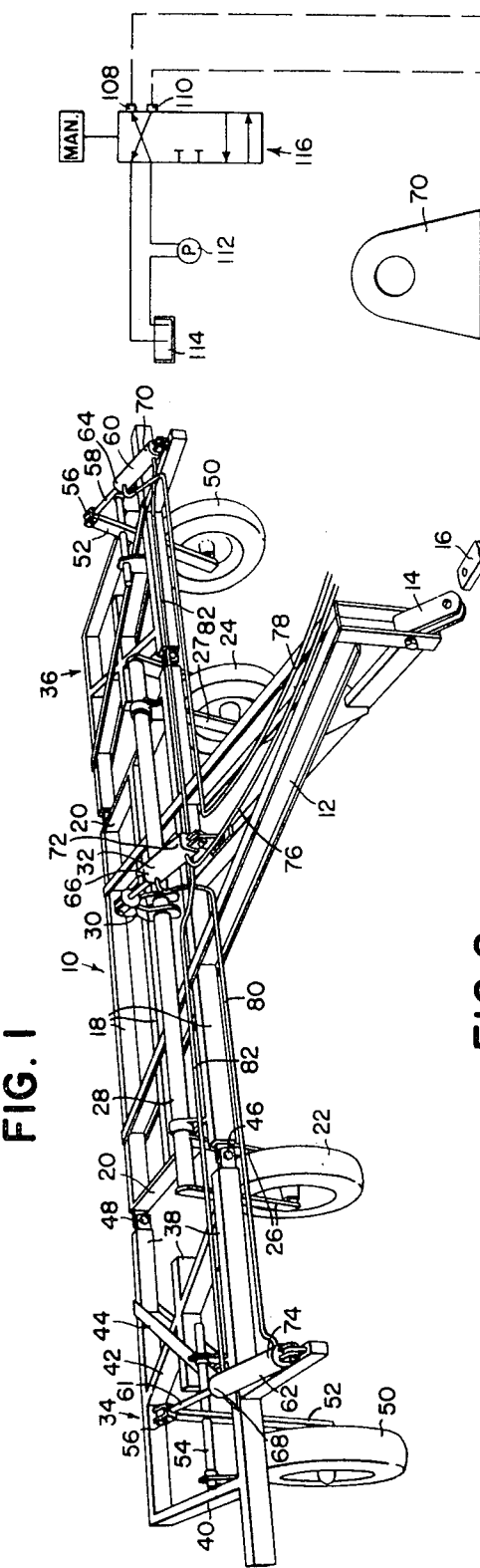
FIG. 1 is a perspective view of an implement carrier in which the principles of this invention have been incorporated.

The implement carrier with which the present invention is adapted to be associated is shown in FIG. 1 and includes a main frame section 10 having a forwardly extending draft frame 12 carrying at its forward end a clevis 14 which may be secured to a tractor drawbar 16. The main frame section 10 includes a plurality of transversely extending toolbars 18 to which various implements, such as chisel plows, may be secured. The toolbars are interconnected by longitudinally extending side rails 20 and the rear ends of the draft frame 12. A pair of right and left ground-engaging wheels 22, 24 are carried by downwardly extending rock arms 26, 27 which are in turn secured to the ends of a rockshaft 28. An intermediate portion of the rockshaft 28 carries upstanding rock arms 30. Hydraulic means in the form of an extensible and retractable double-acting cylinder 32 is pivotally secured to the arms 30 and is utilized to raise and lower the frame section 10 on wheels 22 and 24. The cylinder 32 is of the type having integral stop means and the stop construction may be of the type shown in U. S. Pat. Nos. 2,547,861; 2,615,430; and 2,858,803, as well as others similar to this.

The right and left outrigger frames, indicated generally at 34 and 36, respectively, are substantially identical and each includes front, rear and intermediate toolbars 38 which are interconnected by a longitudinally extending outer strap 40 and cross braces 42, 44. The outrigger frames 34, 36 are secured to the main frame section 10 for pivotal movement about a longitudinally extending axis defined by front and rear pivot bolts 46, 48. Each outrigger frame carries its own ground-engaging wheel 50 carried by a rock arm 52 which is carried by a rockshaft 54, the upper end of each rock arm 52 being pivotally secured to the yoke 56 at one end of the associated piston rod of a hydraulic cylinder. The wheel carried by the left outrigger frame 36 is interconnected through yoke 56 and piston rod 58 with cylinder 60 and the wheel carried by the right outrigger frame 34 is interconnected through yoke 56 and piston rod 61 with the cylinder 62. As can be seen from FIG. 1, the rod ends 64, 66 and 68 of each of the cylinders 60, 32 and 62, respectively, are connected with the rock arm of the associated wheel means, and the anchor ends 70, 72 and 74 are pivotally secured to their associated framework.

The hydraulic means 32 that raises and lowers the main or center frame section 10 and the hydraulic cylinders 60 and 62 that raise and lower the outrigger frame sections 34, 36 are interconnected in series. The cylinder 32 which is first in the series when raising the implement frames has a fluid line 76 connected at one end to its anchor end, the other end of line 76 being connectible alternately with a fluid source and a fluid reservoir. Similarly the cylinder 60 which is last in series has a fluid line 78 which is also connectible alternately with a fluid source and a fluid reservoir, the fluid line 78 being interconnected with the rod end 64 of the cylinder 60. The intermediate cylinder 62 is interconnected with a fluid line 80 at its anchor end, the fluid line 80 being secured at its other end to the rod end 66 of the cylinder 32. Finally a fluid line 82 is provided which is interconnected at one end with the rod end 68 of the cylinder 62 and at the other end with the anchor end 70 of the cylinder 60.

As previously mentioned, the cylinder 32 is of the type having an integral stop mechanism, and this is illustrated by the adjustable stop 84 carried on piston rod 86. If the stop 84 should contact the abutment 88 on the end of stop rod 90 as the cylinder assembly 32 retracts, further retraction will cause the enlarged end 91 of rod 90 to obstruct fluid passage 92, preventing the further discharge of fluid through the port 94.

The displacement of the cylinders in series is so matched that the fluid displaced from the rod end 66 of the cylinder 32 for a given movement of the piston rod 86 will equal the amount of fluid needed within the anchor end 74 of the cylinder 62 to move the piston rod 61 an equal amount; similarly the displacement of the rod end of the cylinder 62 is so matched with the anchor end of the cylinder 60 that equal amounts of displaced fluid will cause equal amounts of movement. In practice, it has been found that substantially equal movements are achieved when the cylinder 32 is a 3½-inch cylinder, the cylinder 62 is a 3¼-inch cylinder, and the cylinder 60 is a 3-inch cylinder.

The cylinders 32, 60 and 62 are each provided with a bypass 98, 96 and 100, respectively.

The operation of the implement carrier is as follows: When it is desired to move the outrigger frames from their working position to the transport position, fluid under pressure is introduced into line 76. This will cause the piston 102 to move toward the rod end 66 of the cylinder 32, displacing fluid through the line 80 into the anchor end 74 of the cylinder 62, in turn causing the piston 104 to move towards rod end 68, displacing fluid through the line 82 into the anchor end 70 of cylinder 60. The pistons 102 and 104 will continue their movement to the rod ends 66 and 68 so long as there is any movement of fluid through the line 82. Should the piston 102 bottom on the rod end 66 of the cylinder 32 before the pistons 104 or 106 of the cylinders 62 and 60 bottom, continued fluid movement is provided through the bypass 98. Similarly, if piston 106 should bottom before pistons 102 and 104 bottom, continued fluid movement is provided through bypass 96. Thus the cylinders may synchronize themselves with each other each time the cylinder assemblies are fully extended.

The fluid lines 76 and 78 are normally connected with tractor outlets 108, 110 which are interconnected with a pump 112 and reservoir 114 on a tractor by means of a manually operated three-way valve indicated generally at 116.

Figure 2:
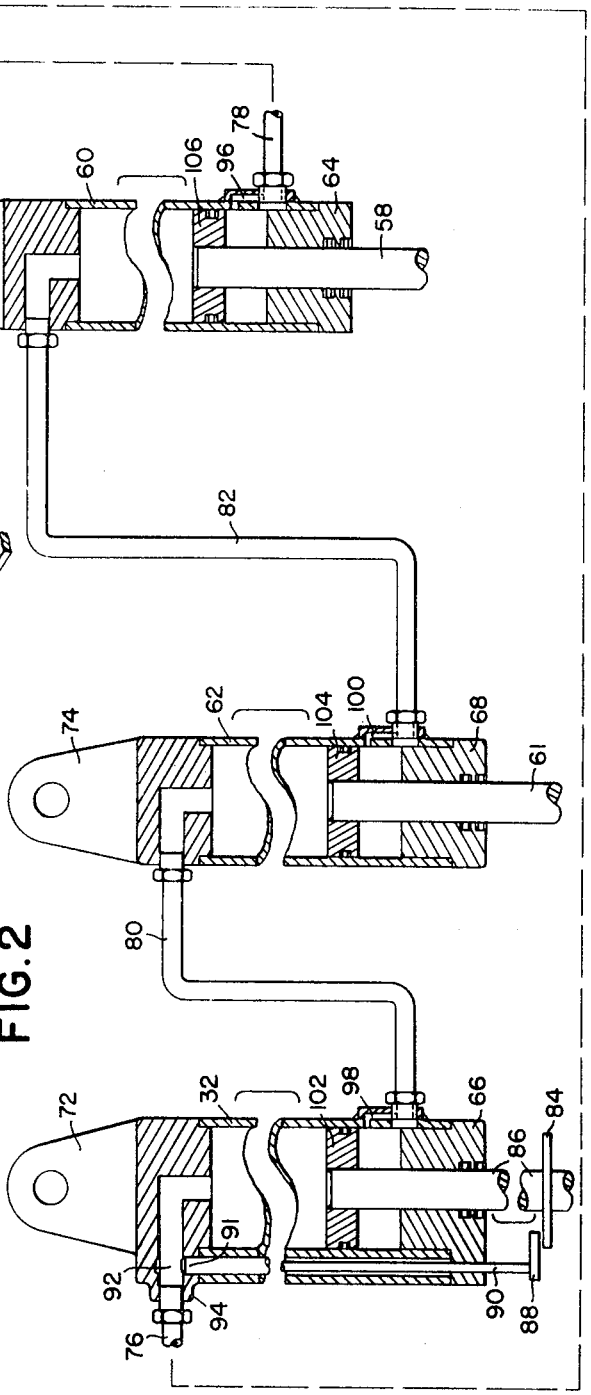
FIG. 2 is a schematic view of the hydraulic controls for operating the implement carrier shown in FIG. 1.

When it is desired to lower the implement, the valve 116 is shifted from the position shown in FIG. 2 so that fluid under pressure will flow from the pump through the line 78, thus moving the piston 106 of the cylinder 60 towards its anchor end. This movement will continue causing accompanying movements of the pistons 104 and 102 until the stop 84 hits the end 88 of rod 90, which will in turn cause the passage 92 to become obstructed, trapping fluid within cylinders 60 and 62. It should be noted that if the stop 88 – 94 were within cylinder 60, cavitation would occur between the anchor end 70 and rod end 68, since the field or transport loads will tend to retract cylinders 32 and 62.

It should be noted that the cylinders are so connected with the pump when raising the implement, fluid will first flow through the largest and then the sequentially smaller cylinders until it returns to the reservoir 114. By employing this arrangement maximum lift capacity of the system is achieved since the maximum lift is determined by the effective cross sectional area of the anchor end of the largest piston 102. The rod end of the piston 102 is of less effective cross sectional diameter since the cross sectional area of the piston rod 86 has to be subtracted from the area of the piston, however this area is equal to the effective cross sectional area of the anchor end of the piston 104. Also, the effective cross sectional area of the rod end of the piston 104 is equal to the effective cross sectional area of the anchor end of the piston 106.

It should also be noted that, while the adjustable stop 84 provides a convenient means to lower the frame sections to the same working depth each time the implement is raised and lowered, it is not necessary that the stop 84 be employed to determine the working depth of the implement. For example, the implement can be lowered to the desired working depth and the valve 116 returned to its neutral position to trap the fluid within line 76 and the cylinders. To change the working depth it is only necessary to move the valve 116 to the appropriate position to supply fluid to or exhaust fluid from the cylinders until the implement has reached the desired working depth and then return the valve 116 to the neutral position to again trap the fluid in the cylinders.

We claim:

1. An implement comprising: a frame, at least two supporting structures mounted on said frame for independent movement, at least two simultaneously operable extensible and retractable hydraulic cylinder means mounted on said frame and operatively connected to said supporting structures to simultaneously vertically adjust said supporting structures relative to the frame, fluid line means interconnecting said hydraulic cylinder means in series, said fluid line means including a fluid line connected to one end of the first cylinder means in series, said fluid line being connectible alternatively to a source of fluid pressure and a fluid reservoir, and the first cylinder means in series including an adjustable stop means to limit its movement in one direction when lowering the frame to its working position, thereby limiting the movement of the other cylinder means.

2. The implement as set forth in claim 1 in which the frame includes a main frame section and an outrigger frame section secured to the main frame section for pivotal movement about a generally longitudinally extending axis, at least one of said supporting structures is mounted on said outrigger frame section and at least one of said cylinder means is mounted on said outrigger frame section and operably connected to the supporting structure mounted on the outrigger frame section.

3. The implement as set forth in claim 2 in which the cylinder means are provided with means to synchronize the cylinder means when they are moved to their limit in one direction.

4. The implement set forth in claim 1 in which the cylinder means are provided with means to synchronize the cylinder means when they are moved to their limit in one direction.

5. An implement comprising: a frame, at least two supporting structures mounted on said frame for independent movement, at least two extensible and retractable double-acting hydraulic cylinder means mounted on said frame and operative when simultaneously extended or retracted to simultaneously move said at least two supporting structures relative to the frame to raise and lower the frame between a raised transport position or various lowered working positions, fluid line means interconnecting said double-acting hydraulic cylinder means in series, said fluid line means including a first fluid line secured to one end of the first cylinder means in series, a second fluid line connected to one end of the last cylinder means in series, the first and second fluid lines being connectible alternatively to a source of fluid pressure and a fluid reservoir, and further fluid line means interconnecting the cylinder means in series, and the first cylinder means in series including an integral adjustable stop means to limit movement in one direction when lowering the frame to its working position, thereby limiting the movement of the other cylinder means.

6. An implement comprising: a frame, at least two supporting structures mounted on said frame for independent movement, at least two simultaneously operable extensible and retractable hydraulic cylinders mounted on said frame and operatively connected to said supporting structures to simultaneously move said supporting structures relative to the frame to raise or lower the frame between raised or lowered positions, each of said cylinders having a piston movable within the cylinder and a piston rod extending to one side of the piston, the effective cross sectional area of the anchor end of the piston being greater than the effective cross sectional area of the rod end of the piston; and fluid line means interconnecting said hydraulic cylinders in series, said fluid line means including a first fluid line secured to the anchor end of the first cylinder in series, a second fluid line connected to the rod end of the last cylinder in series, the first and second fluid lines being connectible to a source of fluid pressure and a fluid reservoir, respectively, when raising, and said first fluid line being connectible to a fluid reservoir when lowering, and further fluid line means interconnecting the rod end of one cylinder in series with the anchor end of another cylinder in series, the rod end of each of the serially connected cylinders being of substantially the same effective cross sectional area as the anchor end of the cylinder to which it is connected by said further fluid line means, and each of the cylinders being provided with a fluid bypass conduit means to allow free flow of fluid through the cylinders when they are moved to their limit in one direction to thereby insure that all the cylinders in series are moved to their limit in said one direction.

7. The implement as set forth in claim 6 in which the frame includes a main frame section and an outrigger frame section secured to the main frame section for pivotal movement about a generally longitudinally extending axis, at least one of said supporting structures is mounted on said outrigger frame section and at least one of said cylinder means is mounted on said outrigger frame section and operably connected to the supporting structure mounted on the outrigger frame section.

8. An implement adapted to be moved forwardly over the ground comprising: a transverse series of rigid frames pivotally connected at adjoining ends for vertical pivotal movement relative to one another about generally longitudinally extending axes, at least one ground-engaging wheel means adjustably mounted on each of said frames for supporting said frames in spaced relation to the ground surface beneath the respective frames whereby, as the implement is moved over an uneven ground surface, the frames will pivot vertically relative to one another in accordance with the ground surface beneath the respective frames to conform to the contour of the ground surface over the entire width of the implement, extensible and retractable hydraulic motors mounted on said frames and connected to the respective wheel means for vertically adjusting the respective frames relative to the wheel means, and fluid line means connecting said motors in series with one another, whereby, by extending or retracting the hydraulic motors, said frames will be shifted vertically to any selected one of a multitude of positions within a range between upper and lower limits while the implement is moved forwardly over the ground, said motors will be extended and retracted substantially in unison and said frames will be moved vertically on their respective wheel means in unison to maintain said frames at equal vertical distances from the ground surface beneath the respective frames at all times irrespective of the ground contour.

9. An implement as set forth in claim 8 wherein each of said motors in series is provided with a fluid bypass circuit means to allow free flow of fluid when they are moved to their limit in one direction to thereby insure that all the motors in series are moved to their limit in said one direction.

10. An implement carrier for supporting earth-working tools comprising: a main frame, a pair of outrigger frames secured to the main frame for pivotal movement about generally longitudinally extending axes, ground-engaging wheel means mounted on and supporting said pair of outrigger frames, extensible and retractable hydraulic cylinders mounted on the pair of outrigger frames and connected to the respective wheel means for vertically adjusting the outrigger frames with respect to the ground surface through a vertical range between upper and lower limits, support means connected to and supporting said main frame, extensible and retractable hydraulic power means associated with said support means for vertically adjusting said main frame with respect to the ground surface through a vertical range between upper and lower limits, fluid line means interconnecting said hydraulic power means and said cylinders in series, and each of said cylinders and said hydraulic power means being provided with a fluid bypass circuit means to allow free flow of fluid when they are moved to their limit in one direction, whereby as the implement carrier is moved over an uneven ground surface, the frames will pivot vertically relative to one another in accordance with the ground surface beneath the respective frames to conform to the contour of the ground surface over the entire width of the implement carrier, and actuation of the hydraulic power means and hydraulic cylinders will vertically adjust the main frame and outrigger frames in unison to maintain the frames at equal vertical distances from the ground surface beneath the respective frames irrespective of the ground contour.

11. An implement comprising: a plurality of frame sections connected in side-by-side relationship for pivotal movement of each section with respect to an adjacent section about a generally longitudinally extending axis, a plurality of independently movable supporting structures mounted on said frame sections to maintain said frame sections in spaced relation to the ground surface beneath the respective sections, there being at least one supporting structure for each frame section, whereby as the implement is moved over an uneven ground surface, the frames will pivot vertically relative to one another in accordance with the ground surface beneath the respective frames to conform to the contour of the ground surface over the entire width of the implement, hydraulic power means mounted on said frame sections and connected to the respective supporting structures for vertically adjusting the respective supporting structures relative to the frame sections and the frame sections relative to the ground surface beneath the respective frame sections, and fluid line means connecting said hydraulic power means in series, said fluid line means including a fluid line having one end connected to the first hydraulic power means in series and the other end connectible alternatively to a source of fluid pressure and a fluid reservoir, whereby said implement can be vertically adjusted to any selected one of a multitude of positions within a range between upper and lower limits during movement over the ground and said hydraulic power means will be activated in unison to vertically adjust the respective frame sections relative to the ground surface beneath the respective frame sections in unison and thereby maintain said frame sections at substantially equal vertical distances from the ground surface beneath the respective frame sections at all times irrespective of the ground contour.

12. An implement supporting structure for use in a tractor-implement combination comprising: a main central frame having means at its forward end adapted for connection to a tractor and having transversely spaced opposite ends; transversely extending outrigger frames pivotally supported on the respective opposite ends of the central frame for independent vertical pivotal movement with respect to the central frame; ground wheels carried on the outrigger frames and being vertically adjustable with respect to their respective frames; hydraulic means on each of the outrigger frames for independently adjusting the wheels with respect to their frames to thereby vertically adjust each of the respective frames with respect to the ground surface through a vertical range between upper and lower limits; means including hydraulic means operatively connected to the main frame for vertically adjusting the main frame through a vertical range of movement between upper and lower limits; hydraulic conduit means connecting the latter hydraulic means and the hydraulic means on the outrigger frames in series, and additional hydraulic conduit means in fluid communication with one of the hydraulic means and with a hydraulic source on the tractor, the additional hydraulic conduit means including valve means controlling the flow of fluid therethrough, whereby the frames may be simultaneously shifted to any selected one of a multitude of positions within their respective vertical ranges while permitting the frames to pivot vertically relative to one another in accordance with the ground surface beneath the respective frames to thereby conform to the contour of the ground surface over the entire width of the implement and maintain the frames equal distances above the ground surface beneath the respective frames irrespective of the ground contour.

13. An implement supporting structure comprising: a main central frame having transversely spaced opposite ends and transversely extending outrigger frames pivotally supported on the respective opposite ends of the central frame for independent vertical movement with respect to the central frame; ground wheels carried on the frames and being vertically adjustable with respect to their respective frames whereby as the implement supporting structure is moved over an uneven ground surface the frames will pivot vertically relative to one another in accordance with the ground surface beneath the respective frames to conform to the contour of the ground surface over the entire width of the implement supporting structure; hydraulic means on each of the frames for independently adjusting the wheels with respect to their frames to thereby vertically adjust each of the respective frames with respect to the ground surface beneath the respective frames through a vertical range between upper and lower limits; and hydraulic conduit means extending between and affording a series relation between the hydraulic means whereby the frames may be simultaneously shifted to any selected one of a multitude of positions within their respective vertical ranges during movement over the ground and are maintained at equal vertical distances above the ground surface beneath the respective frames irrespective of the contour of the ground surface.

14. An implement supporting structure comprising: a main central frame having transversely spaced opposite ends and transversely extending outrigger frames pivotally supported on the respective opposite end for independent vertical movement with respect to the central frame; means including hydraulic means operatively connected to each of the frames for independently vertically adjusting each of the respective frames with respect to the ground surface through a vertical range between upper and lower limits; and hydraulic conduit means extending between and affording a series relation between the hydraulic means, whereby the respective frames will pivot vertically with respect to each other in accordance with the ground surface beneath the respective frames to conform to the contour of the ground surface over the entire width of the implement supporting structure, the frames can be simultaneously shifted to any selected one of a multitude of positions within their respective vertical ranges during movement over the ground surface and are maintained at equal vertical distances above the ground surface beneath the respective frames irrespective of the ground contour.

15. The structure as set forth in claim 14 in which the means connected to the outrigger frames for independently vertically adjusting the outrigger frames are ground wheels mounted on the frames for vertical adjustment with respect thereto, the hydraulic means included with the latter means are extensible and retractable hydraulic cylinders that are connected to the respective frames and their respective ground wheels for vertically adjusting the respective outrigger frames, and the conduit means connects the cylinders in series with one another and with the hydraulic means of the main frame.

16. The structure set forth in claim 15 in which the hydraulic cylinders on the outrigger frames and the hydraulic means of the main frame are of matched displacement and each is provided with a fluid bypass circuit means which affords free flow of fluid when the respective frames are moved to their upper positions.

17. An implement comprising: a frame; at least two supporting structures mounted on the frame for independent movement, at least two simultaneously operable extensible and retractable hydraulic cylinders having anchor and rod ends, the anchor ends of the cylinders being mounted on the frame and the rod ends of the cylinders being operatively connected to the supporting structures to simultaneously move the supporting structures relative to the frame to raise and lower the frame upon extension and retraction, respectively, of the cylinders, the effective cross-sectional area of the anchor end of each cylinder being greater than the effective cross-sectional area of its rod end, first fluid line means connected to the anchor end of one of the cylinders and being alternately connectible to a source of fluid pressure and a fluid reservoir, second fluid line means connected to the rod end of the one cylinder and the anchor end of another cylinder, the rod end of the one cylinder having an effective cross-sectional area substantially equal to the effective cross-sectional area of the anchor end of the cylinder to which it is connected by the second fluid line means, and means to bypass fluid past the one cylinder to the other cylinder, whereby, when the first fluid line means is connected to the source of fluid pressure the cylinders are simultaneously extended equal distances and at equal rates to raise the frame.

* * * * *